Aug. 19, 1930.　　A. L. DENNISTON　　1,773,130
MOTOR CONTROL DEVICE
Filed Feb. 11, 1928
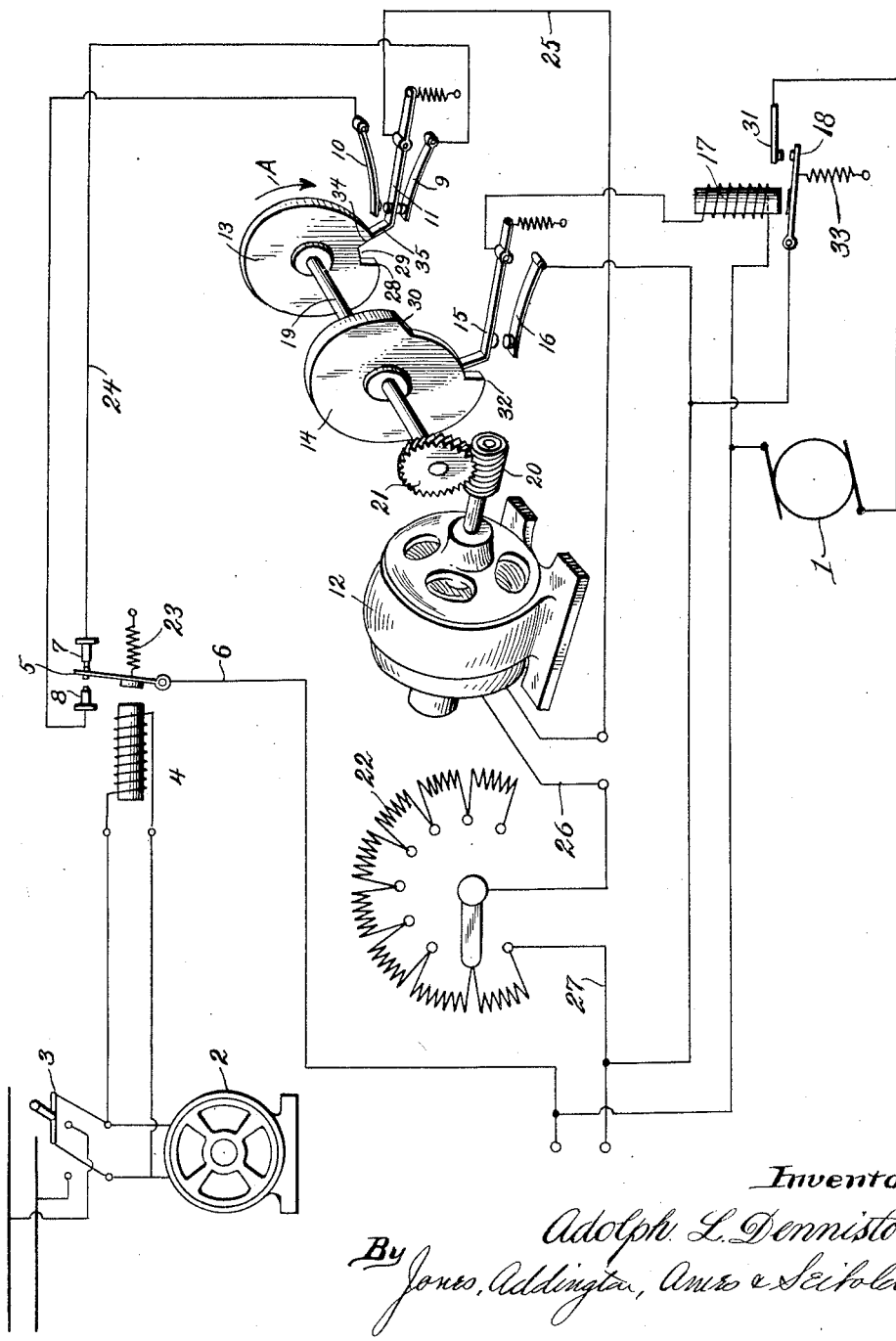
Inventor:
Adolph L. Denniston
By Jones, Addington, Ames & Seibold
Atty's.

UNITED STATES PATENT OFFICE

ADOLPH L. DENNISTON, OF CHICAGO, ILLINOIS, ASSIGNOR, BY MESNE ASSIGNMENTS, TO STROMBERG ELECTRIC COMPANY, A CORPORATION OF DELAWARE

MOTOR-CONTROL DEVICE

Application filed February 11, 1928. Serial No. 253,563.

My invention relates to motor control devices.

One of the objects of my invention is to provide an improved motor control device by means of which an electric motor will be put into operation a predetermined time after the starting switch for another electric motor is open, caused to run a predetermined length of time, and then stopped.

A further object of my invention is to provide a device, as indicated above, in which when the starting switch is again moved to closed position the control device will be re-set ready to repeat the operation when the starting switch is again opened.

Further objects will appear from the description and claims.

In the drawing, in which an embodiment of my invention is shown, the figure shows partly in perspective, partly in elevation, and partly diagrammatically, a motor control device and the parts associated therewith.

One of the situations in which I contemplate that my motor control may be used is in connection with the oil filter of an air circulating system. In such a system an oil filter is provided comprising a series of parallel bars past which the air is drawn, which bars are periodically drenched with oil so that the impurities in the air adhere to the oil-covered bars, and are thus removed from the circulated air. This periodic drenching with oil is effected a predetermined length of time after the starting switch which controls the fan motor has been opened, as it takes an appreciable length of time for the fan motor to stop running after the switch has been opened, and it would not do to have the oil supplied to the filter bars while the fan is running as this would cause particles of oil to be carried along with the circulated air.

The construction shown in the drawing comprises an oil pump motor 1 for causing oil to be supplied to the oil filter bars, a fan motor 2 for effecting circulation of the oil, a starting switch 3 for controlling the fan motor, and means whereby the opening of the fan motor switch will cause the oil pump motor to be started a predetermined time thereafter, run for a predetermined period, and then stopped, and whereby when the fan motor starting switch is again closed the parts will be re-set so that when the fan motor switch is again opened, the operation will be repeated. The means whereby the starting switch for the fan motor controls the operation of the oil pump motor, comprise a relay magnet 4 bridged across the fan motor circuit, a contact member 5 movable back and forth controlled by the relay magnet 4 and connected with one side 6 of a power circuit, a pair of contacts 7 and 8 alternately engaged by said movable contact 5 and thus placed in electrical connection with the power circuit, a second pair of contacts 9 and 10 electrically connected with said first pair of contacts 7 and 8 respectively, a second movable contact 11 for alternately engaging the contacts on said second pair, an electric control motor 12, a cam 13 driven by said control motor for controlling said second movable contact 11, a second cam 14 also driven by said control motor, a movable contact 15 controlled by said cam 14 and caused thereby to move into and out of engagement with respect to another contact 16, a relay magnet 17 energized when said contact 15 is moved into engagement with said contact 16, and a starting switch 18 for the oil pump motor controlled by said relay magnet 17. The two cams may be mounted on a shaft 19 and driven by a worm 20 on the control motor shaft which drives a worm wheel 21 mounted on the cam shaft 19. A suitable rheostat 22 may be provided for securing the desired speed of the control motor.

The parts are shown in the position in which they are found at the instant the starting switch 3 for the fan motor is opened. When this starting switch is opened the relay magnet 4 is de-energized and the spring 23 moves the movable contact 5 to the position shown, in which position the circuit for the control motor will be completed from the power line 6 through the movable contact 5, contact 7, branch circuit 24, contact 9, movable contact 11, wire 25 to the control motor 12, wire 26 from the control motor and rheostat 22 back to the other side 27 of the power circuit. This will put the control motor in operation and this control motor will continue to operate until the cam wheel has made nearly a complete revolution; that is to say, until the cam wheel 13 moves in the direction indicated by the arrow A far enough to permit the movable contact 11 to drop off the point 28 of the cam wheel into the notch 29. This breaks the circuit of the control motor 12 but places the movable contact 11 in engagement with the upper contact 10 so that if later on the movable contact 5 is moved into engagement with the contact 8 the circuit for the control motor will again be completed.

Going back now to the effect of the operation of the control motor on the oil pump motor, during the first part of the revolution of the cam wheel 14 there will be no effect on the starting switch for the oil pump motor, but as the cam wheel continues to rotate the cam portion 30 of this cam wheel will force the movable contact 15 into engagement with the contact 16 thus completing the circuit from the line to the relay magnet 17, and causing the movable contact 18 to engage the contact 31, and thus connect the oil pump motor 1 in the power circuit causing oil to be pumped over the filter bars. At some point in the rotation of the cam wheel not later than the time in which the movable contact 11 drops into the notch 29 the movable contact 15 which controls the oil pump motor will drop off the point 32 of the cam wheel 14 thus opening the circuit of the relay magnet 16 and releasing the movable contact 18 which by the action of the spring 33 is drawn away from the contact 31, thus stopping the oil pump motor. Thus by the action of the two cam wheels both the control motor 12 and the oil pump motor 1 are stopped after a predetermined lapse of time.

I will now describe how the parts are reset for a repeat operation when the fan motor starting switch is again closed. When the fan motor switch 3 is closed the relay magnet 4 is energized attracting its armature and shifting the movable contact 5 into engagement with the contact 8. As the movable contact 11 is at this stage of the proceedings in contact with the upper contact 10 the shifting of the movable contact 5 into engagement with the contact 8 will re-establish the circuit for the control motor 12 which will thus be put in operation and which will continue to operate until the inclined cam surface 34 of the cam wheel engages the inclined portion 35 of the movable contact 11 and causes this movable contact to be moved out of engagement with the upper contact 10 whereupon the control motor will be put out of operation and the cam wheels will be left in the position shown in the drawing, ready to repeat the above cycle of operations when the fan motor starting switch is again opened and closed.

While I have described but one embodiment of my invention, it is obvious that many modifications therein may occur to those skilled in the art, and I desire, therefore, that my invention be limited only by the scope of the appended claims and by the prior art.

I claim:

1. An electric motor for driving an air circulation device, a switch for starting and stopping said motor, a relay magnet which is de-energized when said starting switch is open, a contact movable back and forth controlled by said relay magnet, a pair of contacts alternately engaged by said movable contact, a second pair of contacts electrically connected with said first pair of contacts respectively, a second movable contact for alternately engaging the contacts of said second pair, a second motor controlled by said second movable contact whereby when said two movable contacts are electrically connected, said motor will operate, a cam driven by said motor for causing said second movable contact to engage alternately the contacts of said second pair whereby when said starting switch is opened said second motor will start to operate and will continue to operate until said cam causes said second movable contact to move from engagement with one of the contacts of said second pair into engagement with the other contact of said second pair, and whereby when said starting switch is closed said second motor will again start to operate and will continue to operate until said cam causes said second movable contact to move back to its original position, a third motor, a starting switch therefor, and means comprising a cam driven by said second motor for so controlling the starting switch of the third motor that the third motor will be started a predetermined time after the said switch of the first motor is opened, and will operate for a predetermined period, and will stop not later than the time said second motor is stopped.

2. An electric motor, a starting switch for said motor, a second motor, means whereby when said starting switch is opened the circuit of the second motor will be closed, kept closed for a predetermined time and then opened, and whereby when the first starting switch is closed, the circuit of the second motor will be closed again, kept closed for a predetermined time, and again opened.

3. An electric motor, a starting switch for said motor, a second motor and means whereby when said starting switch is opened said second motor will be caused to operate for a predetermined time and then stop, and whereby when said starting switch is closed, said second motor will be caused to operate again for a predetermined time and then stop.

4. An electric motor, a starting switch for said motor, a second motor and means whereby when said starting switch is opened said second motor will be caused to operate for a predetermined time and then stop, and whereby when said starting switch is closed, said second motor will be caused to operate again for a predetermined time and then stop, a third motor and means whereby said third motor will be put in operation a predetermined time after the first operation of the second motor has started.

5. An electric motor, a starting switch for said motor, a second motor and means whereby when said starting switch is opened said second motor will be caused to operate for a predetermined time and then stop, and whereby when said starting switch is closed, said second motor will be caused to operate again for a predetermined time and then stop, a third motor and means whereby said third motor will be put in operation a predetermined time after the first operation of the second motor has started and will be stopped not later than the close of the first operation of said second motor.

6. An electric motor, a starting switch for said motor, a second motor and means whereby when said starting switch is opened said second motor will be caused to operate for a predetermined time and then stop, and whereby when said starting switch is closed, said second motor will be caused to operate again for a predetermined time and then stop, said means comprising a pair of contacts and a movable contact controlled by said starting switch for alternately engaging the contacts of said pair and a second pair of contacts electrically connected with the contacts of the first pair, respectively, and a second movable contact controlled by the operation of said second motor for alternately engaging the contacts of said second pair.

7. An electric motor, a starting switch for said motor, a second motor and means whereby when said starting switch is opened said second motor will be caused to operate for a predetermined time and then stop, and whereby when said starting switch is closed, said second motor will be closed to operate again for a predetermined time and then stop, said means comprising a pair of contacts and a movable contact controlled by said starting switch for alternately engaging the contacts of said pair and a second pair of contacts electrically connected with the contacts of the first pair, respectively, and a second movable contact alternately engaging the contacts of said second pair, and a cam driven by said second motor for controlling said second movable contact.

8. An electric motor, a starting switch for said motor, a second motor and means whereby when said starting switch is opened said second motor will be caused to operate for a predetermined time and then stop, and whereby when said starting switch is closed, said second motor will be caused to operate again for a predetermined time and then stop, a third motor and means whereby said third motor will be put in operation a predetermined time after the first operation of the second motor has started, said last means comprising a cam driven by said second motor.

9. An electric motor, a starting switch for said motor, a second motor and means whereby when said starting switch is opened said second motor will be caused to operate for a predetermined time and then stop, and whereby when said starting switch is closed, said second motor will be caused to operate again for a predetermined time and then stop, a third motor and means whereby said third motor will be put in operation a predetermined time after the first operation of the second motor has started and will be stopped not later than the close of the first operation of said second motor, said last means comprising a cam driven by said second motor.

In witness whereof, I have hereunto subscribed my name.

A. L. DENNISTON.